United States Patent
Christensen et al.

(10) Patent No.: US 11,527,754 B2
(45) Date of Patent: Dec. 13, 2022

(54) SOLID COMPOSITE ELECTRODE WITH COATED MATERIALS

(71) Applicant: Robert Bosch GmbH, Stuttgart (DE)

(72) Inventors: John F. Christensen, Elk Grove, CA (US); Nathan P. Craig, Santa Clara, CA (US); Sondra Hellstrom, East Palo Alto, CA (US); Boris Kozinsky, Waban, MA (US); Saravanan Kuppan, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 16/618,152

(22) PCT Filed: Sep. 21, 2018

(86) PCT No.: PCT/EP2018/075604
§ 371 (c)(1),
(2) Date: Nov. 28, 2019

(87) PCT Pub. No.: WO2019/063431
PCT Pub. Date: Apr. 4, 2019

(65) Prior Publication Data
US 2021/0143430 A1    May 13, 2021

Related U.S. Application Data

(60) Provisional application No. 62/565,638, filed on Sep. 29, 2017.

(51) Int. Cl.
*H01M 4/04* (2006.01)
*H01M 4/62* (2006.01)
(Continued)

(52) U.S. Cl.
CPC ........... *H01M 4/62* (2013.01); *H01M 4/0402* (2013.01); *H01M 4/0471* (2013.01);
(Continued)

(58) Field of Classification Search
None
See application file for complete search history.

(56) References Cited

U.S. PATENT DOCUMENTS

| | | | |
|---|---|---|---|
| 2001/0046628 A1 | 11/2001 | Oesten et al. | |
| 2012/0052396 A1* | 3/2012 | Tsuchida | H01M 6/185 |
| | | | 429/304 |

(Continued)

FOREIGN PATENT DOCUMENTS

| | | |
|---|---|---|
| CN | 1062444 A | 7/1992 |
| CN | 102893431 A | 1/2013 |

(Continued)

OTHER PUBLICATIONS

English translation of description for JP 2012-094445 (May 17, 2012).*

(Continued)

*Primary Examiner* — Tracy M Dove
(74) *Attorney, Agent, or Firm* — Maginot, Moore & Beck LLP

(57) ABSTRACT

A solid-state composite electrode includes active electrode particles, ionically conductive particles, and electrically conductive particles. Each of the ionically conductive particles is at least partially coated with an isolation material that inhibits inter-diffusion of the ionically conductive particles with the active electrode particles. A battery cell includes a first current collector, a solid electrolyte layer, a first solid-state composite electrode having ionically conductive particles coated with an isolation material and positioned between the first current collector and the solid electrolyte layer, a second current collector, and a second electrode positioned between the solid electrolyte layer and the second current collector. A method of forming a solid-state composite electrode includes mixing together active electrode particles and electrically conductive particles with (Continued)

ionically conductive particles that are each at least partially coated with an isolation material. The mixture is formed into a film via tape-casting, and sintered at a temperature greater than 600° C.

3 Claims, 8 Drawing Sheets

(51) Int. Cl.
*H01M 10/0562* (2010.01)
*H01M 4/131* (2010.01)
*H01M 4/1391* (2010.01)
*H01M 10/0525* (2010.01)
*H01M 4/58* (2010.01)

(52) U.S. Cl.
CPC ......... *H01M 4/131* (2013.01); *H01M 4/1391* (2013.01); *H01M 4/622* (2013.01); *H01M 4/624* (2013.01); *H01M 10/0525* (2013.01); *H01M 4/58* (2013.01); *H01M 2300/0068* (2013.01)

(56) References Cited

U.S. PATENT DOCUMENTS

| | | | | |
|---|---|---|---|---|
| 2013/0260250 | A1* | 10/2013 | Yada | H01M 4/131 |
| | | | | 429/223 |
| 2014/0057180 | A1* | 2/2014 | Iwasaki | H01M 4/62 |
| | | | | 429/304 |
| 2014/0170503 | A1 | 6/2014 | Yushin et al. | |
| 2014/0308572 | A1* | 10/2014 | Tsuchida | H01M 4/62 |
| | | | | 429/162 |
| 2014/0322613 | A1* | 10/2014 | Kitagawa | H01M 4/625 |
| | | | | 429/232 |
| 2016/0013479 | A1* | 1/2016 | Iwasaki | H01M 10/0562 |
| | | | | 429/305 |
| 2016/0285080 | A1 | 9/2016 | Yokoyama | |
| 2016/0359191 | A1 | 12/2016 | Teraoka et al. | |
| 2018/0226681 | A1* | 8/2018 | Hasegawa | H01M 10/052 |

FOREIGN PATENT DOCUMENTS

| | | |
|---|---|---|
| EP | 3 073 557 A1 | 9/2016 |
| JP | 2012-94445 A | 5/2012 |
| WO | 2014/132333 A1 | 9/2014 |

OTHER PUBLICATIONS

International Search Report corresponding to PCT Application No. PCT/EP2018/075604, dated Jan. 3, 2019 (4 pages).
Sakurai, Y. et al., "Preparation of amorphous Li4SiO4—Li3PO4 thin films by pulsed laser deposition for all-solid-state lithium secondary batteries," Solid State Ionics, vol. 182, pp. 59-63, 2011 (5 pages).
Ito, Yusuke et al., "Application of LiCoO2 Particles Coated with Lithium Ortho-Oxosalt Thin Films to Sulfide-Type All-Solid-State Lithium Batteries," Journal of The Electrochemical Society, 162 (8), pp. A1610-A1616, (2015) (7 pages).
Park, Kyusung et al., "Electrochemical Nature of the Cathode Interface for a Solid-State Lithium-Ion Battery: Interface between LiCoO2 and Garnet-Li7La3Zr2O12," Chemistry of Materials, 2016, 28, pp. 8051-8059 (9 pages).
Sakuda, Atsushi et al., "Interfacial Observation between LiCoO2 Electrode and Li2S-P2S5 Solid Electrolytes of All-Solid-State Lithium Secondary Batteries Using Transmission Electron Microscopy," Chemistry of Materials, 2010, 22, pp. 949-556 (8 pages).
Sakuda, Atsushi et al., "Sulfide Solid Electrolyte with Favorable Mechanical Property for All-Solid-State Lithium Battery," Scientific Reports, 3, 2261, Jul. 23, 2013 (5 pages).
Tatsumisago, Masahiro et al., "Recent development of sulfide solid electrolytes and interfacial modification for all-solid-state rechargeable lithium batteries," Journal of Asian Ceramic Societies, 1 (2013) 17-25 (9 pages).

* cited by examiner

SOLID COMPOSITE ELECTRODE WITH COATED MATERIALS

RELATED APPLICATIONS

This application is a 35 U.S.C. § 371 National Stage Application of PCT/EP2018/075604, filed on Sep. 21, 2018, which claims the benefit of priority from U.S. Provisional Application No. 62/565,638, filed on Sep. 29, 2017, the disclosures of which are incorporated herein by reference in their entirety.

TECHNICAL FIELD

This disclosure relates generally to solid-state batteries and, more particularly, to solid-state composite electrodes.

BACKGROUND

Solid-state batteries have been the subject of increasing amounts of research due to the promise of improved reliability, durability, safety, energy density, and cycling performance Many performance factors of solid-state batteries, however, are based on characteristics of the interfaces between different materials within the battery. High interfacial impedance between a solid-state electrolyte and a solid-state active material, for example, leads to decreased power capability during discharge. High interfacial impedance can result from many different factors, such as poor contact between materials, reactions between battery materials and other materials or the surrounding environment, and inter-diffusion of different battery materials.

FIG. 1 depicts a plan schematic of a conventional solid state composite electrode 10. The electrode 10 includes particles of active material 12, particles of ionically conductive material 14, and particles of electronically conductive material 16. The materials 12-16 have been assembled into composite via a sintering process so that the active material particles 12 are held in close contact with the ionically conductive particles 14. For example, an active material particle 12' is held in close contact with an ionically conductive material particle 14'.

FIG. 2 depicts a detail schematic of an interface between the active material particle 12' and the ionically conductive material particle 14' from FIG. 1. While sintering generally results in good contact between the active material particle 12' and the ionically conductive particle 14', high temperatures associated with the sintering process of 600° C.-900° C. or more can result in an inter-diffusion region 20 between the particles 12' and 14' (note: inter-diffusion region 20 is not visible in FIG. 1). As used herein, "inter-diffusion" means an at least partial physical mixing of materials and/or a chemical reaction between the materials. The inter-diffusion region 20 can decrease the ionic conductivity between the active material particle 12' and the ionically conductive particle 14' and can thus result in an increased interfacial impedance between the active electrode material 12 and the ionically conductive material 14 (FIG. 1), and a decrease in the discharge power capability of cells that include the electrode 10.

Therefore, a solid-state electrode with low interfacial impedance between active electrode material and electrolyte material would be beneficial. A solid state electrode with materials that have a limited amount or no inter-diffusion would also be beneficial.

SUMMARY

In order to reduce interfacial impedance between active electrode material and electrolyte material relative to conventional electrodes, and to improve power capability during discharge relative to conventional electrodes, a solid-state composite electrode includes particles of an ionically conductive material that are each at least partially coated with an isolation material that inhibits intermixing and/or inter-diffusion of active electrode material and electrolyte material.

In some embodiments, a solid-state composite electrode includes particles of an active electrode material, particles of an ionically conductive material, and particles of an electrically conductive material. Each of the particles of the ionically conductive material is at least partially coated with an isolation material selected to inhibit inter-diffusion of the ionically conductive material with the active electrode material. In some embodiments, each of the particles of the ionically conductive material is at least substantially coated with the isolation material. In some embodiments, each of the particles of the ionically conductive material is completely coated with the isolation material.

In some embodiments, at least one of (i) each of the particles of the active electrode material is at least partially coated with the isolation material, and (ii) each of the particles of the electrically conductive material is at least partially coated with the isolation material.

In some embodiments the particles of the active electrode material, the particles of the ionically conductive material, and the particles of the electrically conductive material are bound together via sintering.

In some embodiments the ionically conductive material includes at least one of LLZO, a lithium aluminum titanium phosphate material, and a lithium lanthanum titanate material.

In some embodiments, the isolation material includes at least one of $LiBO_3$, $Li_4SiO_4$, and $Li_3PO_4$.

In some embodiments, the isolation material is a mixture of approximately 60% $Li_4SiO_4$ and approximately 40% $Li_3PO_4$ by weight.

In some embodiments, the coating of the isolation material on each particle of the ionically conductive material has a thickness that is less than or equal to 1,000 nanometers. In some embodiments, the coating of the isolation material on each particle of the ionically conductive material has a thickness that is less than or equal to 100 nanometers.

A method of forming a solid-state composite electrode includes mixing together particles of an active electrode material, particles of an ionically conductive material, and particles of an electrically conductive material. In some embodiments, the method includes applying an isolation material to the particles of the ionically conductive material so that each of the particles of the ionically conductive material is at least partially coated with the isolation material. In some embodiments, the isolation material is applied prior to the mixing. In some embodiments, the isolation material is applied after the mixing. In some embodiments, the particles of ionically conductive material are provided with isolation material at least partially coating each particle. The isolation material is selected to inhibit inter-diffusion of the active electrode material with the ionically conductive material. The mixture is formed into a film via a tape-casting process. The film is sintered at a temperature greater than 600° C. to form a solid-state composite electrode.

In some embodiments, the isolation material is applied to each of the particles of the ionically conductive material via a gel coating process or a pulsed laser deposition process.

In some embodiments, the method further includes mixing a polymer binder together with the mixture of the particles of the active electrode material, the particles of the ionically conductive material, and the particles of the electrically conductive material. The method also further includes, prior to sintering the film, heating the film to 500° C. or greater in an oxygen containing atmosphere until the polymer binder is at least substantially burned off.

In some embodiments the sintering is a co-sintering process that includes sintering the film with at least one of (i) particles for forming a solid electrolyte layer, or particles for forming a solid electrolyte layer and a film for forming a further solid-state composite electrode, and (ii) at least one current collector.

In order to reduce interfacial impedance between active electrode material and electrolyte material relative to conventional battery cells, and to improve power capability during discharge relative to conventional battery cells, a battery cell includes a solid-state composite electrode with particles of an ionically conductive material that are each coated with an isolation material that inhibits intermixing and/or inter-diffusion of active electrode material and electrolyte material.

In some embodiments, a battery cell includes a first current collector, a solid electrolyte layer, a first electrode, a second current collector, and a second electrode. The first electrode is positioned between the first current collector and the solid electrolyte layer. The first electrode is a solid-state composite electrode including particles of an active electrode material, particles of an ionically conductive material, and particles of an electrically conductive material. Each of the particles of the ionically conductive material is at least partially coated with an isolation material selected to inhibit inter-diffusion of the ionically conductive material with the active electrode material. The second electrode is positioned between the solid electrolyte layer and the second current collector.

In some embodiments, each of the particles of the ionically conductive material is at least substantially coated with the isolation material. In some embodiments, each of the particles of the ionically conductive material is completely coated with the isolation material.

In some embodiments, the solid electrolyte layer includes further particles of the ionically conductive material that form a homogeneous solid-solid interface with the particles of the ionically conductive material in the first electrode.

In some embodiments, at least one of (i) each of the particles of the active electrode material is at least partially coated with the isolation material, and (ii) each of the particles of the electrically conductive material is at least partially coated with the isolation material.

In some embodiments, the second electrode is a further solid-state composite electrode including particles of a further active electrode material, further particles of the ionically conductive material, and further particles of electrically conductive material. Each of the further particles of the ionically conductive material is at least partially coated with the isolation material, which is further selected to inhibit inter-diffusion of the ionically conductive material with the further active electrode material.

In some embodiments, each of the further particles of the ionically conductive material is at least substantially coated with the isolation material. In some embodiments, each of the further particles of the ionically conductive material is completely coated with the isolation material.

In some embodiments, a method of forming a battery cell with a solid-state composite electrode includes co-sintering at least one of the solid-state composite electrode, a solid electrolyte layer, and a further solid-state composite electrode. In some embodiments, the co-sintering occurs with the at least one electrode, electrolyte layer, and further electrode positioned between a first and second current collector.

In some embodiments, a method of forming a battery cell with a solid-state composite electrode includes separately forming at least one of the solid-state composite electrode, a solid electrolyte layer, and a further solid-state composite electrode, and joining the solid-state composite electrode, the solid electrolyte layer, and the further solid-state composite electrode together between a first and second current collector via cold pressing.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 3:
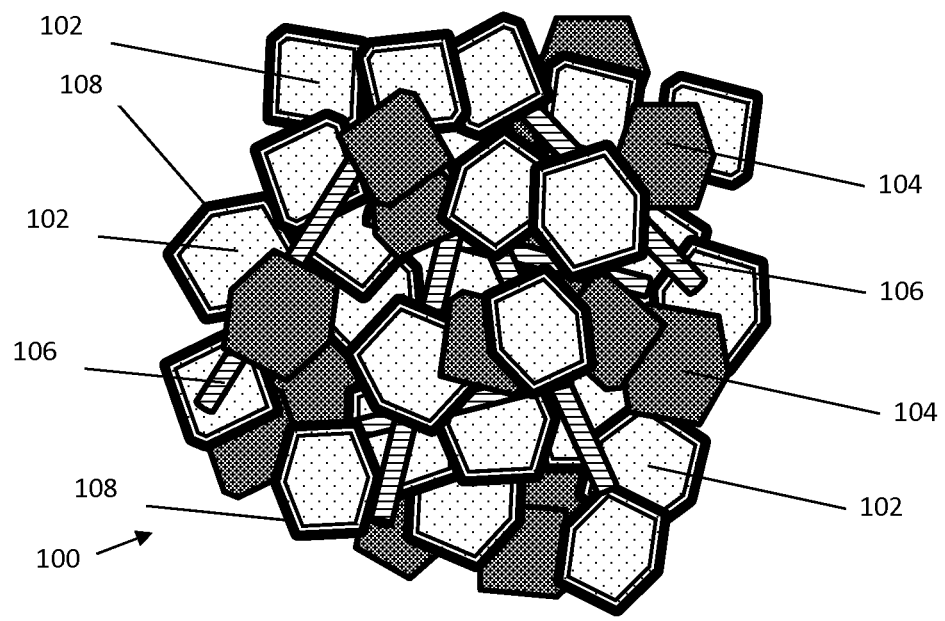
FIG. 3 depicts a plan schematic of an exemplary embodiment of a composite solid-state electrode with particles having an isolation coating.

FIG. 3 depicts a plan schematic of an exemplary embodiment of a solid state composite electrode 100 according to this disclosure. The electrode includes particles of active material 102, particles of ionically conductive material 104, and particles of electronically conductive material 106. The particles 102-106 are held together in close contact as a result of a sintering process.

In some embodiments, the electrode 100 is a cathode, and the active material particles 102 include any acceptable cathode material such as, for example, a nickel-cobalt-magnesium-oxide material, a nickel-cobalt-aluminum-oxide material, a lithium-cobalt-oxide material, a lithium-iron-phosphate material, a lithium-titanium-oxide material, sulfide-based materials, spinel materials, and combinations thereof. In some embodiments, the electrode 100 is an anode, and the active material particles 102 include any acceptable anode material such as, for example, lithium titanate.

Any acceptable solid electrolyte material is usable as the ionically conductive material for the ionically conductive particles 104 such as, for example, $Li_7La_3Zr_2O_{12}$ (also known as "LLZO"), a lithium aluminum titanium phosphate material, a lithium lanthanum titanate material, or combinations thereof. Any acceptable electrically conductive material is usable for the particles of electronically conductive material 106 such as, for example, a graphite material, an oxide material such as $TiO_2$, $SnO_2$, $In_2O_3$, ZnO, and ITO, or combinations thereof.

Each of the particles of active material 102 includes an isolation coating 108. The coating 108 is formed from a material or materials that, when located between the active material of the particles 102 and the ionically conductive material for the particles 104, inhibits intermixing of the active material and the ionically conductive material. Additionally, the material of the coating 108 does not intermix with either of the active material of the particles 102 or the ionically conductive material of the particles 104. In particular, the coating 108 inhibits inter-diffusion during high temperatures, such as during a sintering process. In some embodiments, inhibiting of intermixing and/or inter-diffusion of the active material and the ionically conductive material reduces interfacial impedance between the active material and the ionically conductive material relative to conventional electrodes. In some embodiments, inhibiting intermixing and/or inter-diffusion improves power capability during discharge relative to conventional electrodes.

In some embodiments, the coating 108 is formed from at least one of $LiBO_3$, $Li_4SiO_4$, $Li_3PO_4$, or the like. In some embodiments, the coating material is a mixture of approximately 60% $Li_4SiO_4$ and approximately 40% $Li_3PO_4$ by weight. Other materials are used for the coating 108 in other embodiments. In some embodiments, the coating 108 on each of the particles 102 has a thickness that is less than or equal to 1,000 nanometers. In some embodiments, the thickness of the coating 108 is less than or equal to 100 nanometers. Other thicknesses are used in other embodiments.

In some embodiments, each of the particles 102 is at least partially coated with the isolation coating 108. In some embodiments, each of the particles 102 is at least substantially coated with the isolation coating 108. In some embodiments, each of the particles 102 is completely coated with the isolation coating 108.

Figure 1:
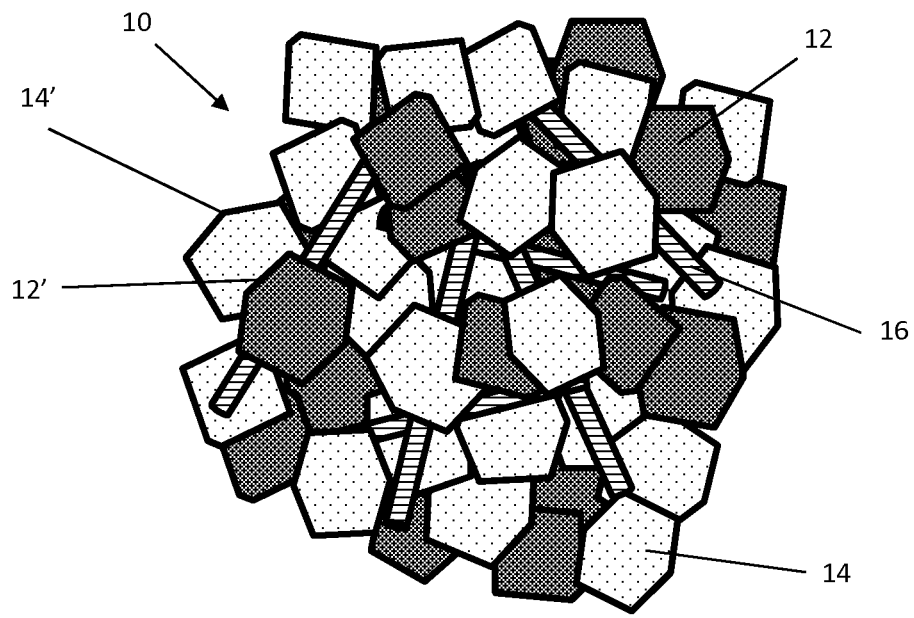
FIG. 1 depicts a plan schematic of a conventional composite solid-state electrode.
Figure 2:
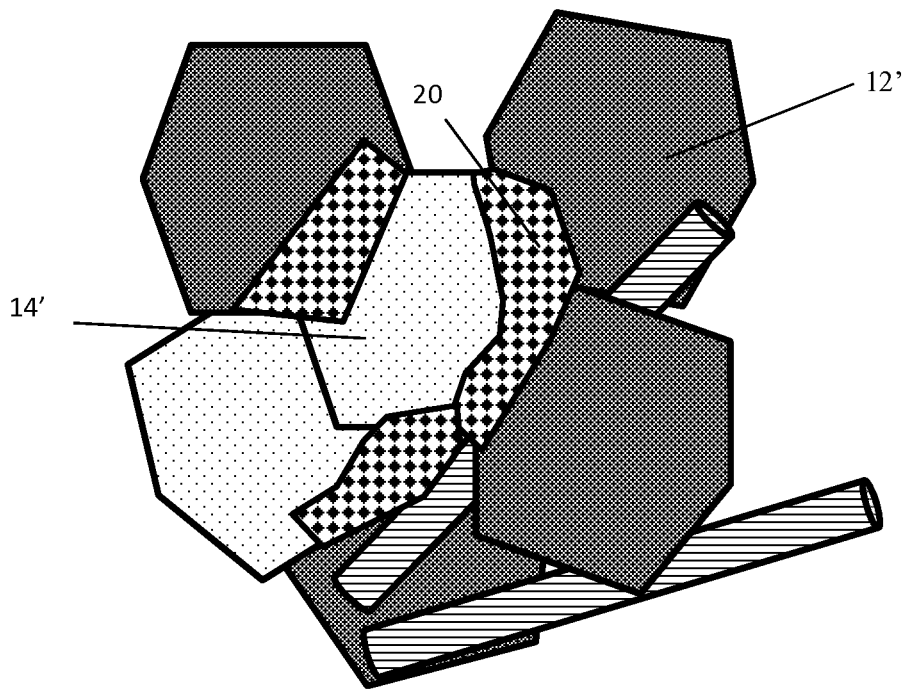
FIG. 2 depicts a detail schematic of an interface between particles of the electrode of FIG. 1.
Figure 4:
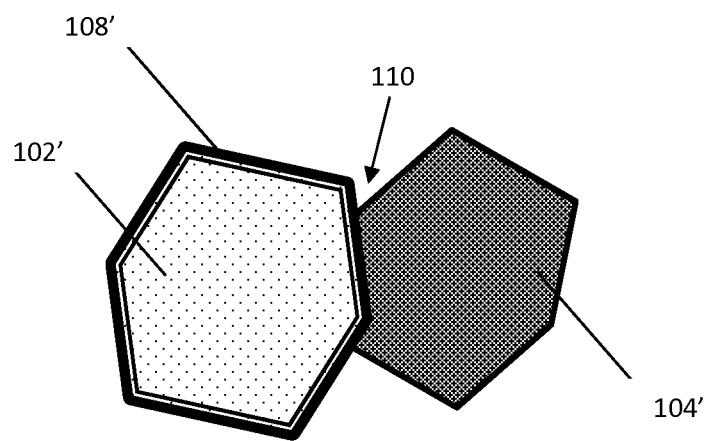
FIG. 4 depicts a detail schematic of an interface between particles of the electrode of FIG. 3.

FIG. 4 depicts a detail schematic of an interface 110 between an active material particle 102' and an ionically conductive particle 104' after having been sintered together. The isolation coating 108' on the active material particle 102' causes a reduction in inter-diffusion present between the active material of the particle 102' and the ionically conductive material of the particle 104' relative to the inter-diffusion depicted in FIG. 2. In the embodiment depicted in FIG. 4, the isolation coating 108' completely inhibits inter-diffusion between the active material of the particle 102' and the ionically conductive material of the particle 104'.

Figure 5:
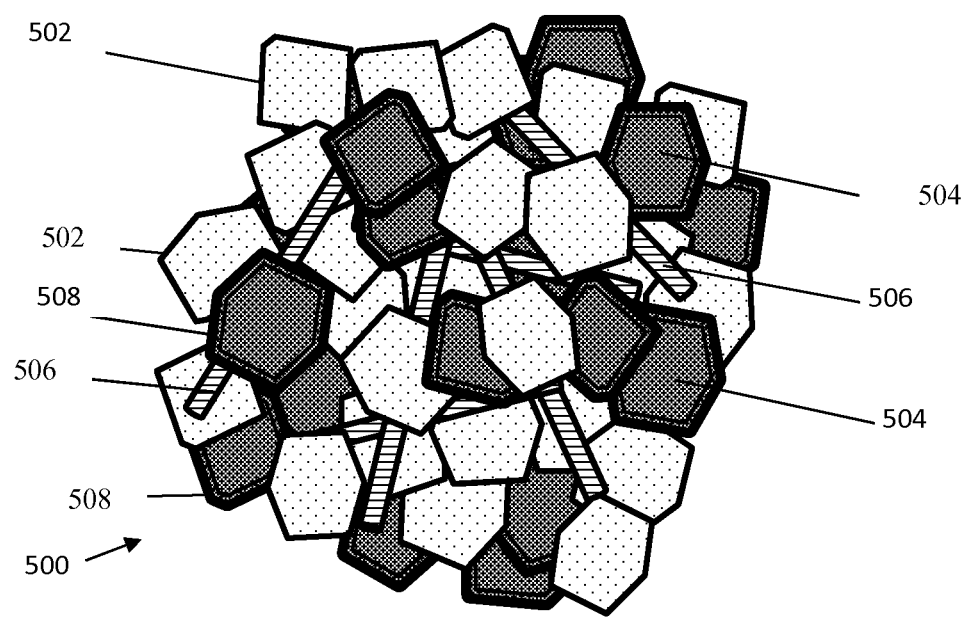
FIGS. 5, 6a, and 6b depict different exemplary embodiments of a composite solid-state electrode with particles having an isolation coating.

While the embodiment in FIGS. 3 and 4 includes an isolation coating 108 on the particles of active material 102, in other embodiments, an isolation coating is included on other particles in addition to or instead of the active particles. FIG. 5 depicts another exemplary embodiment of a solid state composite electrode 500. The electrode includes particles of active material 502, particles of ionically conductive material 504, and particles of electronically conductive material 506. The particles 502-506 are held together in close contact as a result of a sintering process. In this embodiment, each of the particles of ionically conductive material 504 includes an isolation coating 508.

Figure 6A:
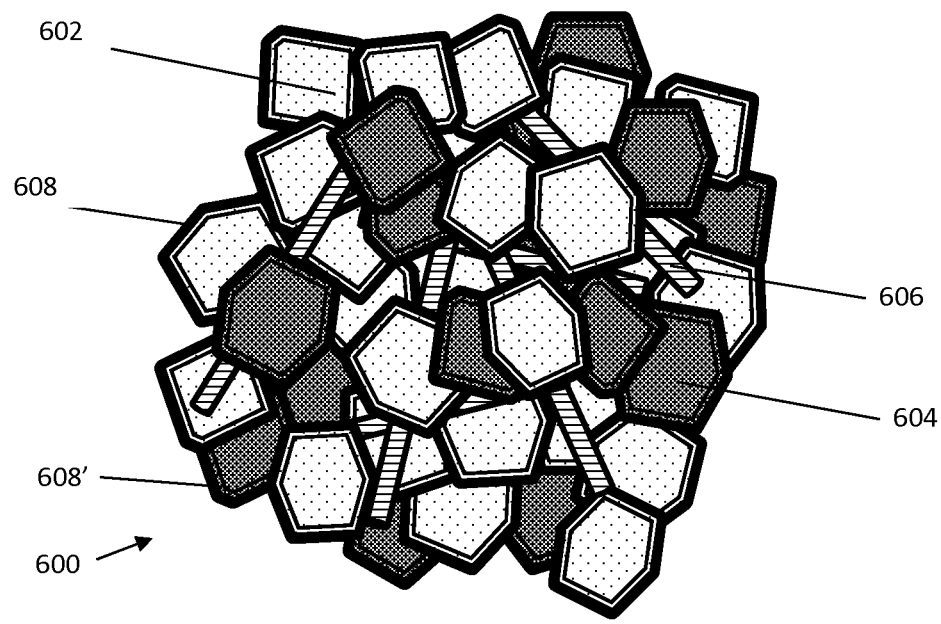

FIG. 6a depicts a further exemplary embodiment of a solid state composite electrode 600. The electrode includes particles of active material 602, particles of ionically conductive material 604, and particles of electronically conductive material 606. The particles 602-606 are held together in close contact as a result of a sintering process. In this embodiment, each of the particles of active electrode material 602 includes an isolation coating 608, and each of the particles of ionically conductive material 604 includes an isolation coating 608'.

In some embodiments, the isolation coating 608 is the same as the isolation coating 608'. In some embodiments, the isolation coating 608 and the isolation coating 608' include different materials. In some embodiments, each of the particles 602 and 604 is at least partially coated with the isolation coating 608. In some embodiments, each of the particles 602 and 604 is at least substantially coated with the isolation coating 608. In some embodiments, each of the particles 602 and 604 is completely coated with the isolation coating 608.

Figure 6B:
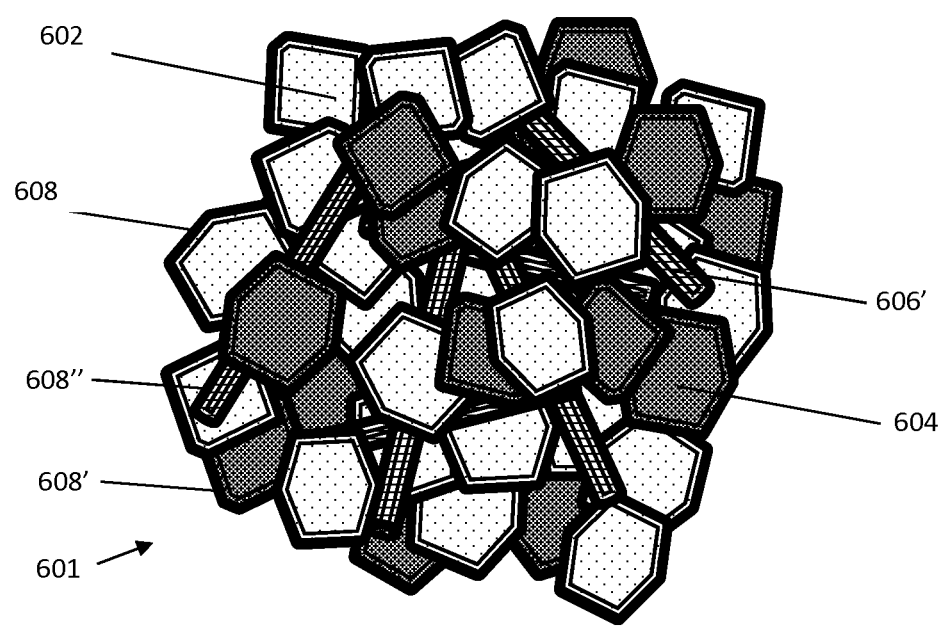

FIG. 6b depicts a further exemplary embodiment of a solid state composite electrode 601. The electrode includes particles of active material 602, particles of ionically conductive material 604, and particles of electronically conductive material 606'. The particles 602, 604, and 606' are held together in close contact as a result of a sintering process. In this embodiment, each of the particles of active electrode material 602 includes an isolation coating 608, each of the particles of ionically conductive material 604 includes an isolation coating 608', and each of the particles of electronically conductive material 606' includes an isolation coating 608".

In some embodiments, the isolation coatings 608, 608', and 608" are the same. In some embodiments, the isolation coatings 608, 608', and 608" include different materials. In some embodiments, each of the particles 602, 604, and 606' is at least partially coated with the isolation coating 608. In some embodiments, each of the particles 602, 604, and 606' is at least substantially coated with the isolation coating 608. In some embodiments, each of the particles 602, 604, and 606' is completely coated with the isolation coating 608.

Figure 7:
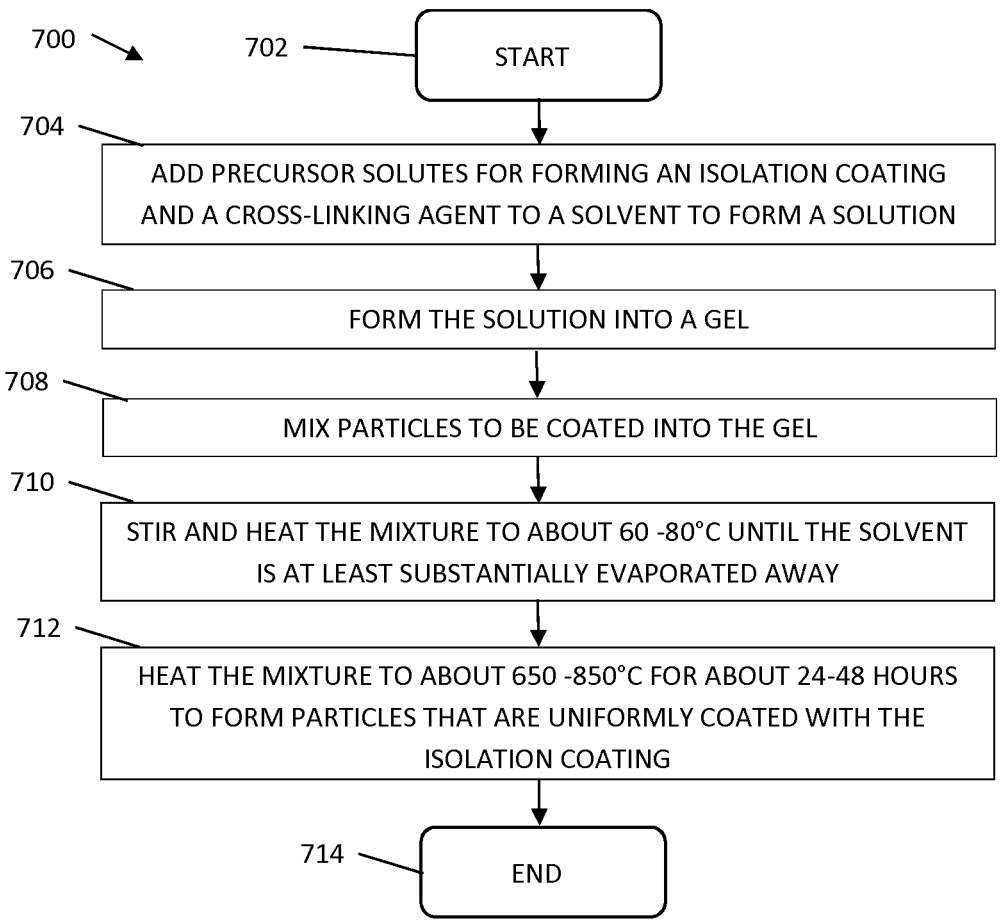
FIGS. 7 and 8 depict flow diagrams of different exemplary embodiments of methods of applying an isolation coating to particles for a composite solid-state electrode.

FIG. 7 depicts a flow diagram of an exemplary method 700 for producing particles with an isolation material at least partially coated each particle via a gel coating process. The method starts at block 702. At block 704, precursor solutes for forming an isolation coating are added with a cross-linking agent to a solvent to form a solution. In some embodiments where the isolation coating includes a mixture of 60% by weight $Li_4SiO_4$ and 40% by weight $Li_3PO_4$, the precursor solutes include approximately stoichiometric amounts of a lithium precursor and a phosphate precursor. In some embodiments, the lithium precursor is $CH_3COOLi$ or Li acetyl actonate. In some embodiments, the phosphate precursor is $H_3PO_4$ or $NH_42H_2PO_4$. In some embodiments, the cross-linking agent is $Si(OC_2H_5)_4$. In some embodiments, the solvent is ethanol, water, or combinations thereof. Other materials for the precursor solutes, the cross-linking agent, and the solvent are used in other embodiments.

At block 706, the solution is formed into a gel, i.e., a sol solution. Any acceptable method of forming a gel is usable. In some embodiments, forming the gel includes resting the solution for a period of time such as, for example, 24-48 hours, to enable sedimentation of the solution to occur, and draining off excess liquid after the resting. In some embodiments, forming the gel includes using a centrifuge. In some embodiments, forming the gel includes a drying process to remove excess liquid.

At block 708, particles to be coated are mixed into the gel. In various embodiments, the particles are particles of active electrode material, particles of ionically conductive material, particles of electrically conductive material, and combinations thereof. At block 710, the mixture is stirred and heated to about 60-80° C. until the solvent is at least substantially evaporated away. In some embodiments, the solvent is completely evaporated away. At block 712, the resulting mixture is heated to at about 650-850° C. for about 24-48 hours to form particles that are each at least partially coated with the isolation coating. In some embodiments, the particles are at least substantially coated with the isolation coating. In some embodiments, the particles are completely coated with the isolation coating. In some embodiments, the particles are completely coated with the isolation coating. In some embodiments, the coating on the particles is substantially uniform. The method ends at block 714.

Figure 8:
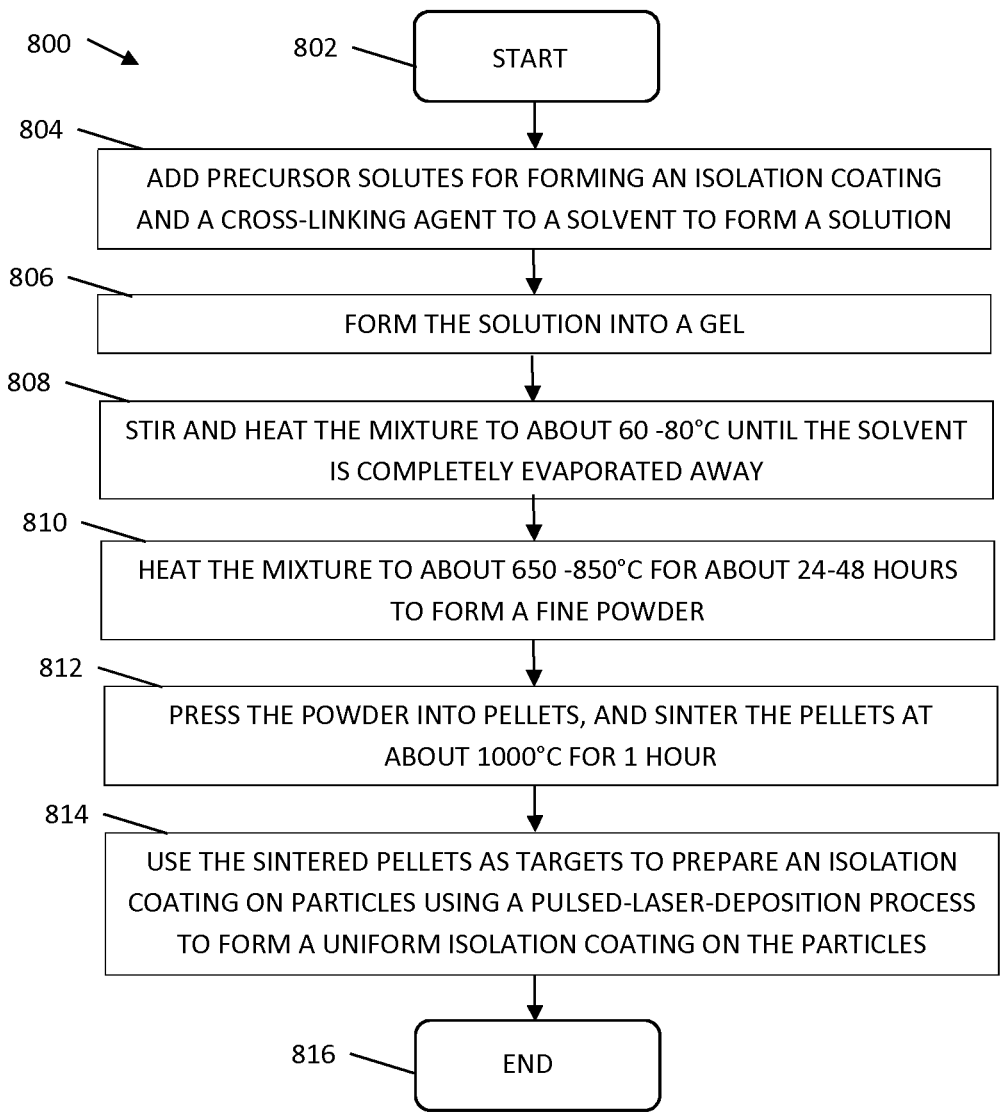

FIG. 8 depicts a flow diagram of another exemplary method 800 for producing particles with an isolation coating on each particle via a pulsed laser deposition process. The method starts at block 802. At block 804, precursor solutes for forming an isolation coating are added with a cross-linking agent to a solvent to form a solution. At block 806, the solution is formed into a gel. At block 808, the solution is stirred and heated to about 60-80° C. until the solvent is completely evaporated away. At block 810, the resulting mixture is heated to at about 650-850° C. for 24-48 hours to form a fine powder. At block 812, the powder is pressed into pellets and sintered at 1000° C. for 1 hour. At block 814, the resulting sintered pellets are used as targets to prepare an isolation coating on particles using a pulsed-laser-deposition process to form an isolation coating on the particles. In various embodiments, the particles are particles of active electrode material, particles of ionically conductive material, particles of electrically conductive material, or combinations thereof. In some embodiments, the particles are at least substantially coated with the isolation coating. In some embodiments, the particles are completely coated with the isolation coating. In some embodiments, the particles are completely coated with the isolation coating. In some embodiments, the coating on the particles is substantially uniform. The method ends at block 816.

Other methods to apply the isolation coating to the particles of active electrode material are also contemplated in other embodiments, such as atomic layer deposition, chemical vapor deposition, and sputtering, for example.

Figure 9:
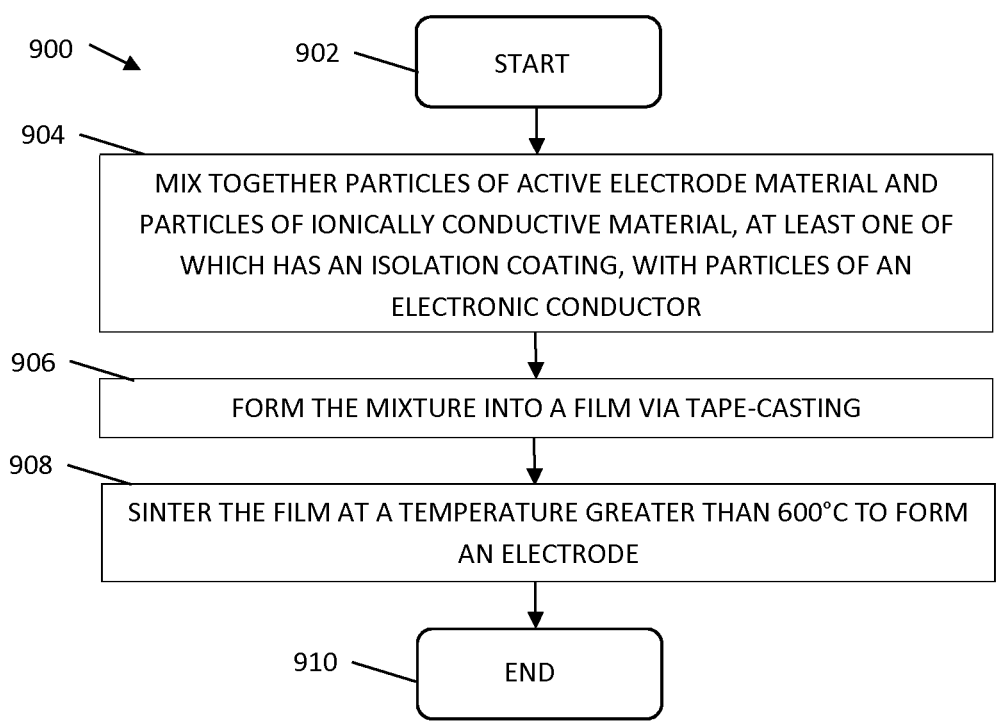
FIGS. 9 and 10 depict flow diagrams of different exemplary embodiments of methods of forming a composite solid-state electrode with particles having an isolation coating.

FIG. 9 depicts an exemplary embodiment of a method 900 for forming an electrode that includes particles with an isolation coating. The method begins at block 902. At block 904, particles of active electrode material and particles of ionically conductive material, at least one of which has an isolation coating, are mixed together with particles of an electronic conductor. In some embodiments, the electronic conductor is graphite. In some embodiments, the particles of the electronic conductor also have an isolation coating. At block 906, the mixture is formed into a film via a tape-casting process. In some embodiments, the tape-casting process is binder free. At block 908, the film is sintered at a temperature greater than 600° C. to form an electrode. The method ends at block 910.

Figure 10:
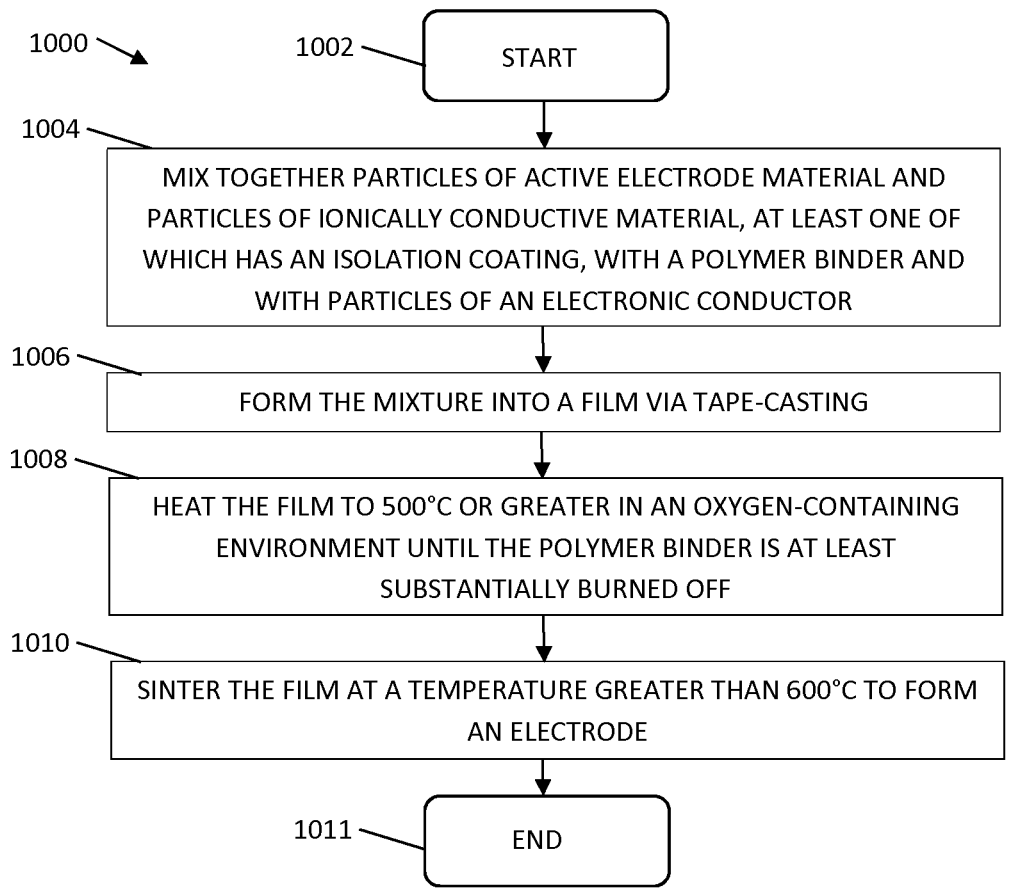

FIG. 10 depicts another exemplary embodiment of a method 1000 for forming an electrode that includes particles with an isolation coating. The method starts at block 1002. At block 1004, particles of active electrode material and particles of ionically conductive material, at least one of which has an isolation coating, are mixed together with a polymer binder and particles of an electronically conductive oxide such as, for example, $TiO_2$, $SnO_2$, $In_2O_3$, ZnO, and ITO, or combinations thereof. In some embodiments, the particles of the electronically conductive material also include an isolation coating. At block 1006, the mixture is formed into a film via a tape-casting process. At block 1008, the film is heated to 500° C. or greater in an oxygen containing atmosphere until the polymer binder is at least substantially burned off. At block 1010, the film is sintered at a temperate greater than 600° C. to form an electrode. The method ends at block 1012.

Figure 11:
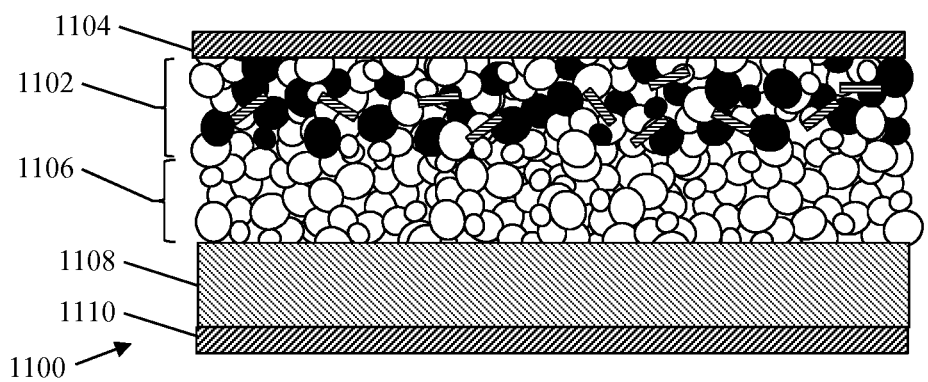
FIG. 11 depicts an exemplary embodiment of a cell that includes a composite solid-state electrode with particles having an isolation coating.

FIG. 11 depicts a cell 1100 that includes an electrode 1102 similar in structure to one of the electrode embodiments from FIGS. 3, 5, and 6. In other words, the electrode 1102 is a composite electrode including particles of active electrode material and particles of ionically conductive material, at least one of which has an isolation coating, as well as particles of an electronic conductor. The cell 1100 additionally includes a first current collector 1104, a solid electrolyte layer 1106, a second electrode 1108, and a second current collector 1110.

The electrode 1102 is disposed between the first current collector 1104 and the solid electrolyte layer 1106. The solid electrolyte layer 1106 separates the electrode 1102 from the second electrode 1108. The second electrode 1108 is disposed between the solid electrolyte layer 1106 and the second current collector 1110.

Any acceptable current collector is usable as the first current collector 1104 or the second current collector 1110 such as, for example a metal grid or foil. Any acceptable material is usable to form such a collector such as, for example, aluminum, lithium, steel, copper, iron-nickel alloy, or combinations thereof.

In this embodiment, the solid electrolyte layer 1106 is formed from particles of the same type of material forming the ionically conductive particles in the electrode 1102. Using the same types of materials for the ionically conductive particles in the electrode 1102 and the solid electrolyte layer 1106 enables a homogeneous solid-solid interface between the ionically conductive particles in the electrode 1102 and similar particles in the solid electrolyte layer 1106. In some embodiments, the material or materials forming the solid electrolyte layer 1106 are different from the ionically conductive particles in the electrode 1102.

In some embodiments, two or more of the electrode 1002, solid electrolyte layer 1106, and second electrode 1108 are co-sintered. In some embodiments, materials for the electrode 1102, solid electrolyte layer 1106, and second electrode 1108 are assembled between the current collectors 1104 and 1110, and the assembly is then sintered to form the cell 1100. In some embodiments, one or more of the electrode 1102, solid electrolyte layer 1106, and second electrode 1108 are separately produced and assembled together to form the cell 1100 by any acceptable process such as, for example, a cold-press process.

In some embodiments, the electrode 1102 is a positive electrode, and the second electrode 1108 is a negative electrode. In some embodiments, the electrode 1102 is a negative electrode, and the second electrode 1108 is a positive electrode. In some embodiments, the second electrode 1108 is a composite electrode similar to the electrode 1102. In some embodiments, the second electrode 1108 is not a composite electrode, whereby any acceptable electrode is usable such as, for example, a lithium-based electrode as a negative electrode.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A method of forming a solid-state composite electrode, comprising:
   mixing together particles of an active electrode material, particles of an ionically conductive material, and particles of an electrically conductive material, wherein each of the particles of the ionically conductive material is at least partially coated with an isolation material configured to inhibit inter-diffusion of the active electrode material with the ionically conductive material to form a mixture;
   mixing a polymer binder together with the mixture of the particles of the active electrode material, the particles of the ionically conductive material, and the particles of the electrically conductive material;
   forming the mixture mixed with the polymer binder into a film via a tape-casting process;
   heating the film to 500° C. or greater in an oxygen containing atmosphere until the polymer binder is at least substantially burned off; and
   sintering the film, after the polymer binder is at least substantially burned off, at a temperature greater than 600° C. to form a solid-state composite electrode.

2. The method of claim 1, wherein the coating of the isolation material on each of the particles of the ionically conductive material is formed via:
   a gel coating process; or
   a pulsed laser deposition process.

3. The method of claim 1, wherein the sintering is a co-sintering process that includes sintering the film with at least one of:
   (i) particles for forming a solid electrolyte layer, or particles for forming a solid electrolyte layer and a film for forming a further solid-state composite electrode; and
   (ii) at least one current collector.

* * * * *